United States Patent
Ding

(10) Patent No.: US 9,433,056 B2
(45) Date of Patent: Aug. 30, 2016

(54) LIGHT STRING HAVING AT LEAST ONE PROTECTING CIRCUIT

(71) Applicant: Yunmeng Yun Xi Lighting Products Co., Ltd., Xiaogan (CN)

(72) Inventor: Feng Ding, Xiaogan (CN)

(73) Assignee: YUNMENG YUN XI LIGHTING PRODUCTS, Xiaogan (CN)

( * ) Notice: Subject to any disclaimer, the term of this patent is extended or adjusted under 35 U.S.C. 154(b) by 0 days.

(21) Appl. No.: 14/919,686

(22) Filed: Oct. 21, 2015

(65) Prior Publication Data

US 2016/0143099 A1     May 19, 2016

Related U.S. Application Data

(63) Continuation-in-part of application No. 14/574,629, filed on Dec. 18, 2014, now Pat. No. 9,204,502.

(30) Foreign Application Priority Data

Nov. 14, 2014   (CN) .......................... 2014 2 0680609

(51) Int. Cl.
*H05B 37/00*     (2006.01)
*H05B 33/08*     (2006.01)
*H05B 37/02*     (2006.01)

(52) U.S. Cl.
CPC ........ *H05B 33/089* (2013.01); *H05B 33/0803* (2013.01); *H05B 33/0824* (2013.01); *H05B 33/0848* (2013.01); *H05B 37/02* (2013.01); *Y02B 20/42* (2013.01)

(58) Field of Classification Search
CPC ........................ H05B 33/0884; H05B 33/0887

USPC .... 315/185 R, 224, 225, 226, 291, 307, 308
See application file for complete search history.

(56) References Cited

U.S. PATENT DOCUMENTS

| | | | | |
|---|---|---|---|---|
| 4,973,896 | A * | 11/1990 | Shiga ................... | H02J 7/1438 290/40 C |
| 6,342,805 | B1 * | 1/2002 | Chen .................... | H03K 17/945 327/278 |
| 8,143,800 | B2 * | 3/2012 | Liu ...................... | H02M 1/4258 315/219 |
| 8,917,027 | B2 * | 12/2014 | Radermacher ..... | H05B 33/0821 315/200 R |
| 9,210,757 | B2 * | 12/2015 | Tao .................... | H05B 33/0815 |

* cited by examiner

*Primary Examiner* — Thuy Vinh Tran
(74) *Attorney, Agent, or Firm* — Hemisphere Law, PLLC

(57) ABSTRACT

The present invention provides a light string including at least one light series branch and a protecting circuit connected between the at least one light series branch and an AC power supply. The protecting circuit includes a switching circuit, a sample circuit and a control circuit for switching off the switching circuit and keeping the switching circuit at off-state when the sampled voltage is larger than or equal to a preset voltage, and controlling the switching circuit to turn on and turn off the at least one light series branch. When the number of the failed lamps and removed lamps reaches to a preset number, the current is opened to protecting the reminder light from been burned out. The light string can light on and off alternately like twinkling stars, or the colors can be changed alternately.

20 Claims, 4 Drawing Sheets

LIGHT STRING HAVING AT LEAST ONE PROTECTING CIRCUIT

CROSS-REFERENCE TO RELATED APPLICATIONS

The present application is a continuation-in-part of U.S. Pat. No. 9,204,502, issued on Dec. 1, 2015, which claims the benefit of CN Utility Patent No. 201420680609.3, issued on Feb. 4, 2015, all of which are incorporated herein by reference in their entireties.

BACKGROUND OF THE INVENTION

1. Field of the Invention

The invention relates to light strings, and particularly to a light string with over-current protection function.

2. Description of Related Art

Light strings are widely used for decorative purposes, especially for holiday lighting. Light strings refer to incandescent filament lamps or LED lamps connected electrically in a series. Generally, a light string includes more than 10 incandescent filament lamps, and is powered by mains electricity, such as 110V AC mains electricity. Each of the light connected in the light string typically includes a lamp, a socket for receiving the lamp, and a holder for receiving the socket and two metal conductive pieces which are electrically connected to the lamp. The two metal conductive pieces are electrically connected to the metal conductive pieces of adjacent lights via electrical wires.

In the conventional light strings, when the lamp fails and the lamp remains in the socket, or when the lamp is removed from its socket for replacement, the closed path for the flow of electrical current is interrupted and the remainder of the lamps in the string will no longer be illuminated. To prevent the occurrence of this condition, a "smart light" is invented. In the smart light, a protruded end made of insulating material is protruded from a lower end of the socket, and the two metal conductive pieces are formed to have elastic structures. When the socket with a lamp is inserted in the holder, the protruded end is inserted between the two metal conductive pieces, thus the two metal conductive pieces are electrically isolated. When the socket with the lamp is removed from the holder, the two metal conductive pieces are electrically connected depending on the elastic structures, thus the remainder lamps can still illuminate.

When the lamp is an incandescent filament lamp, to prevent fails of the light string because of one or more lamps are burned out, the lamps of the smart light use bulbs with a fuse. The fuse will short the two pins of the bulb once the filament of the lamp is burned out thus the remainder lamp can still illuminate. For smart LED lamp, when one or more lamps are not illuminated because of over current, the failed lamp(s) is(are) substantially short circuit, thus the remainder lamp can still illuminate. However, the total resistance of the light string becomes lowered when any lamp is burned out or is removed from the holder, and a current of the light string become larger. When the number of the burned lamps and removed lamps reaches to a certain number, the power of the light string will exceeds the rated power of the reminder lamps, this may cause burned out of all the reminder lamps, even fire.

To prevent this situation, a resistor or a diode or a combination of a resistor and a diode whose resistance is close to that of the lamp is utilized to be connected parallel to each lamp in an existing smart light, thus the fuse in the incandescent filament lamp is omitted. When the lamp is burned out or is removed, the resistor or the diode or the combination of the two is connected in series in the circuit, thus the reminder lamps can still illuminate, and a total resistance of the light string will not lowered, over current will not occur. However, this structure of the light string uses a lot of resistors/diodes, and causes big power loss, large heat release, and high cost. Therefore, an improved light string is needed.

BRIEF DESCRIPTION OF THE SEVERAL VIEWS OF THE DRAWING(S)

The foregoing and other exemplary purposes, aspects and advantages of the present invention will be better understood in principle from the following detailed description of one or more exemplary embodiments of the invention with reference to the drawings, in which.

DETAILED DESCRIPTION OF THE INVENTION

The invention will now be described in detail through several embodiments with reference to the accompanying drawings.

Figure 1:
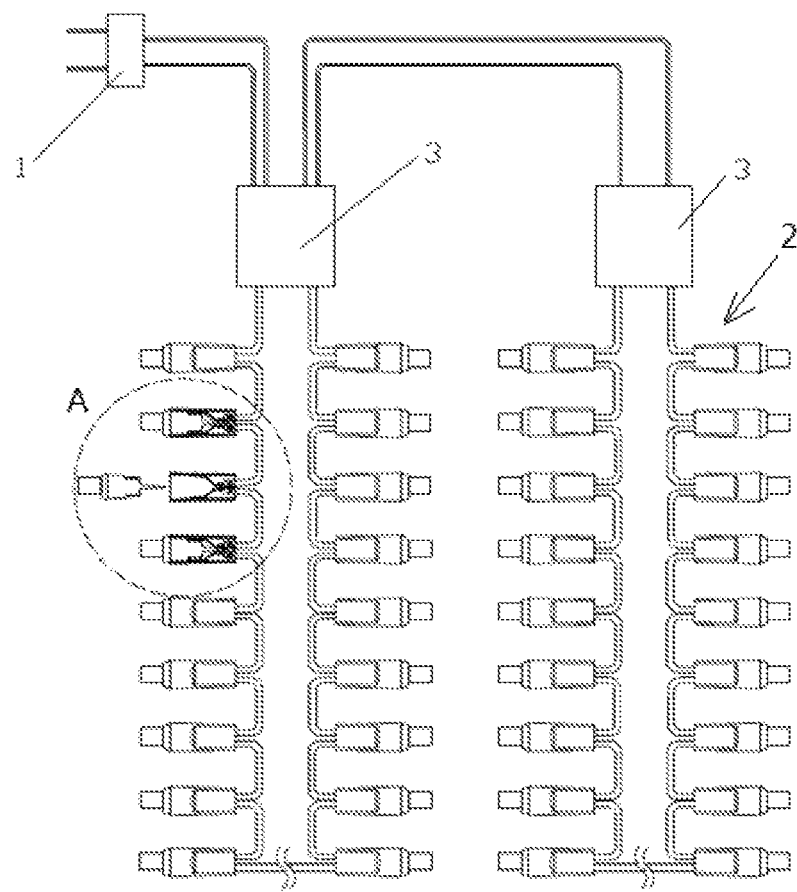
FIG. 1 is a perspective view of a light string in accordance with an embodiment of the invention.
Figure 2:
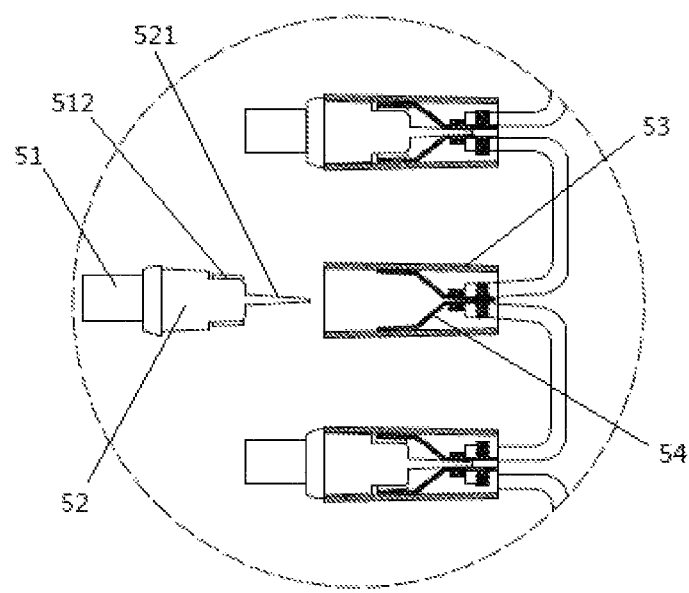
FIG. 2 is a enlarged view of part A of the light string of FIG. 1.

FIG. 1 illustrates a light string of an embodiment of the present invention. The light string includes a power plug 1, two protecting circuit 3 and two light series branches 2. Each of the two protecting circuit 3 is connected in series with one of the two light series branches 2 to form a series circuit, and the two series circuit are electrically connected in parallel at an output terminal of the power plug 1. In detail, the protecting circuit 3 is connected between the light series branch 2 and the power plug 1. Each light series branch 2 includes ten to thirty lights connected in series. It is understandably that the number of the light series branches and their protecting circuit 3 is not limited to two, there can be three or more light series branches 2 each configured a protecting circuit. The protecting circuit 3 is mainly used for electrically isolating the corresponding light series branch 2 and the power plug 1 when the current flowing in the corresponding light series branch 2 is equaled to or higher than a preset current, as a result, the reminder lamps in the corresponding light series branch 2 are protected. The protecting circuit 3 is also used for controlling the corresponding light series branch 2 to illuminate and go off alternately, just like twinkling stars.

It is understandably, there can be only one series circuit composed of one protecting circuit 3 and a light series branch 2, or more than two series circuits each composed of one protecting circuit 3 and one light series branch 2. Herein after, one of the series circuit is described. The protecting circuit 3 is located on a printed circuit board which is sealed in an insulating housing. A positive input terminal and a negative input terminal are configured at an end of the printed circuit board, and a positive output terminal and a negative output terminal are configured at the other end of the printed circuit board. Two electrical wires extending from the output terminal of the power plug 1 are electrically connected with the positive input terminal and the negative input terminal of the protecting circuit 3, respectively. The positive input terminal and the negative input terminal of the protecting circuit 3 are also respectively electrically connected to the positive input terminal(s) and the negative input terminal(s) of the other protecting circuit(s) to realize parallel connection of the light series branches 2. The positive output terminal and the negative output terminal of the protecting circuit 3 are connected to two terminals of the light series branch 2. In detail, wire holes are defined in the side wall of the insulating housing, wires from the power plug 1 or connected to the other protecting circuit, and wires connected with the light series branch 2 pass through the wire holes, and are connected with corresponding terminals on the printed circuit board.

The structure of the light in the light series branch is such designed that the light series branch will not break (open) when one or more lamps are removed from the holders of the lights or the lamps are burned out, and a voltage drop on every remainder light becomes larger than before. In particularly, lights of the light series branch 2 utilizes LED lamp, and the light series branch 2 has a positive terminal and a negative terminal. In an exemplary embodiment, each light in the light series branch includes a lamp 51, a socket 52 for receiving a lower part of the lamp 51, and a holder 53 for receiving the socket 52. At least two lamp pins extend downwardly from the lamp 51. The socket 52 includes a receiving part for receiving a lower part of the lamp, a guiding block extended from the bottom end of the receiving part, and a plug-in piece extending from the bottom end of the guiding block. Side wall or bottom board of the receiving part of the socket 52 defines two or more wire holes. The lamp pins of the lamp 51 pass through the wire holes on the socket 52, and is folded up to attach the outside surface of the socket 52. The holder 52 is hollow, and receives two conductive pieces which are separated apart with each other and are respectively connected to terminals of wires connecting adjacent lights or the protecting circuit 3. The socket 52 with the lamp mounted therein is detachably received in the holder 53, and the lamp pins are electrically attached to corresponding conductive pieces with the plug-in piece located between the two conductive pieces. In detail, each conductive piece includes a first conductive part and a second conductive part connected with the first conductive part. When the socket is inserted in the holder, the first conductive parts are respectively electrically connected with the lamp pins and are electrically isolated by the receiving part and the guiding block, and the second conductive parts are electrically isolated by the guiding block and the plug-in piece. When the socket is removed from the holder, at least the second conductive parts are electrically attached depending on elastic structures.

Figure 3:
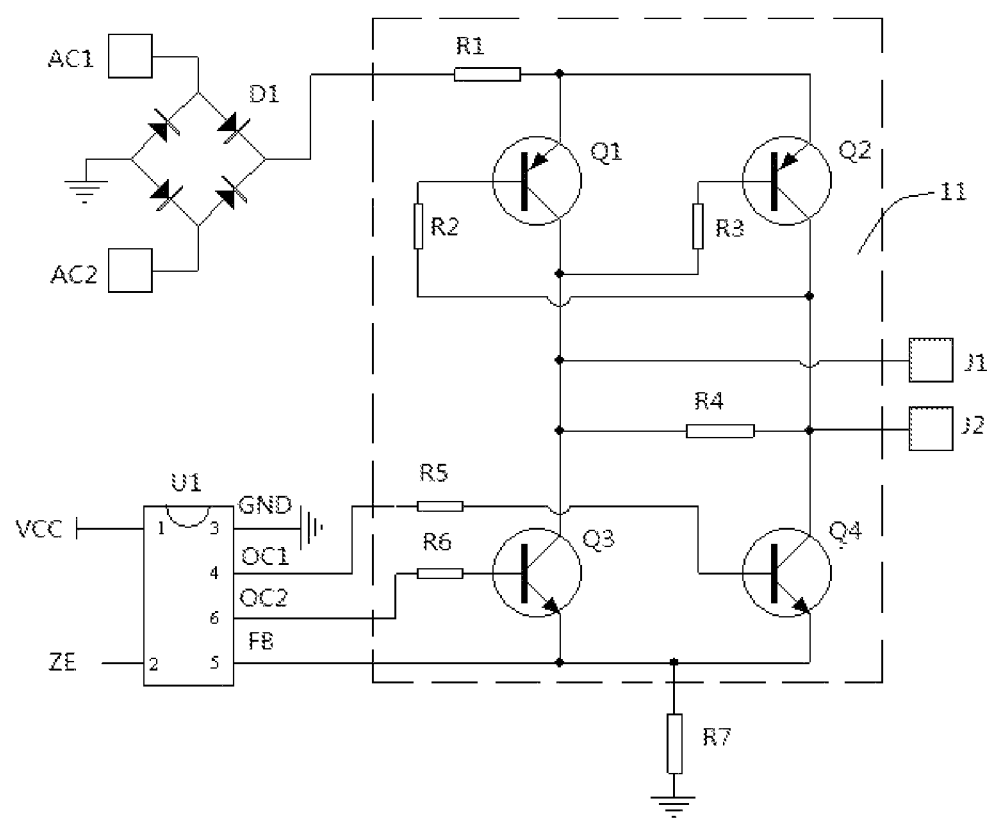
FIG. 3 is a partial circuit diagram of the light string in accordance with an embodiment of the invention, the light string includes a control chip.

FIG. 3 illustrates a part of a circuit diagram of the light string according to an embodiment of the present invention. As shown in the figure, the protecting circuit 3 mainly includes a diode bridge rectifier D1, a switching circuit 11, a sampling resistive element R7 acted as a sample circuit and a control circuit including a control chip U1.

The diode bridge rectifier D1 is used for converting the AC current received from output pins AC1, AC2 of the power plug 1 into DC current. An positive output of the diode bridge rectifier D1 is connected to an input of the switching circuit 11, and a negative output of the diode bridge rectifier D1 is grounded (connected to earth ground or a common ground).

The switching circuit 11 mainly includes a first switching unit and a second switching unit, and has two output terminals: a first output terminal J1 and a second output terminal J2. The first and the second output terminals J1, J2 are connected to two ends of the light series branch 2. When one of the first switching unit and the second switching unit is on/conducting, an electric potential of one of the first and the second output terminals J1, J2 is high (close to a voltage of the positive output of the diode bridge rectifier D1), and an electric potential of the other of the first and the second output terminals J1, J2 is low (close to ground). When the other of the first switching unit and the second switching unit is on/conducting, the electric potential of one of the first and the second output terminals J1, J2 is low, and the electric potential of the other of the first and the second output terminals J1, J2 is high. The light series branch 2 connected between the output terminals J1, J2 can be illuminated and gone off.

Please referring to FIG. 3, in the embodiment, the first switching unit includes a first switch Q1, a fourth switch Q4 and a balancing resistive element R4. The second switching unit includes a second switch Q2, a third switch Q3 and the balancing resistive element R4. All resistive elements mentioned in the Specification of the present invention are referring to pure resistance, or electronic components those can be considered as or equivalent to resistors, such as impeders. First terminals of the first switch Q1 and the second switch Q2 is connected to the positive output of the diode bridge rectifier D1 via a resistive element R1. Second terminals of the first switch Q1 and the second switch Q2 are connected to second terminals of the third switch Q3 and the fourth switch Q4, respectively. Second terminals of the first switch Q1 and the second switch Q2 are also connected to two ends of the balancing resistive element R4. A control terminal of the first switch Q1 is connected to the second terminal of the second switch Q2 via a resistive element R2. A control terminal of the second switch Q2 is connected to the second terminal of the first switch Q1 via a resistive element R3. First terminals of the third and the fourth switches Q3, Q4 are grounded via the sampling resistive element R7. Control terminals of the third and the fourth switches Q3, Q4 are connected to two output terminals OC2 and OC1 of the control chip U1 via resistive elements R6 and R5, respectively. The two ends of the balancing resistive element R4, connected to the second terminals of the first and second switches Q1 and Q2 respectively, act as the first output terminal J1 and the second output terminal J2 of the switching circuit 11, respectively.

Particularly, types of the first to the fourth switches are such configured that when the fourth switch Q4 is switched on by the control chip U1, the first switch is switched on accordingly, and when the third switch Q3 is switched on by the control chip U1, the second switch Q2 is switched on accordingly. And only one of the first and the second switches Q1, Q2 can be switched on/conducting at the same time. Depending on the configuration, one of the electric potentials of the first and the second output terminals J1, J2 is high while the other is low at the same time, thus the light series branch 2 connected between terminal J1 and J2 can realize twinkle function.

In the embodiment, the first switch Q1 and the second switch Q2 utilize PNP type transistors, and the third switch Q3 and the fourth switch Q4 utilize NPN type transistors. The first terminals of the first to the fourth switches are all emitters, the second terminals of the first to the fourth switches are all collector, and the control terminals are all base. In other embodiments, the first to the fourth switches may be choose MOSFETs (Metal-Oxide-Semiconductor Field-Effect Transistor), IGBTs (Insulated Gate Bipolar Transistor), etc. In other embodiments, the first and the second switching units may have other configurations.

The sample circuit is used for sampling a line current flowing in the light series branch 2 or a current relative to the line current flowing in the light series branch 2, and generating a sampled voltage corresponding to the sampled line current. Depending on the sampled voltage, the control chip U1 can consider how many lamps are removed from the holders of the lights or burned out. When the sampled voltage is equal to or higher than a preset value, the control chip U1 may consider that there are too many lamps are removed or burned out, and the remained lamps may take a risk of being burned out because of over-voltage, the control chip U1 will control the switching circuit 11 to electric isolate the light series branch 2 and the power plug 3. In the embodiment, an end of the sampling resistive element R7 is connected to the first terminals of the third and fourth switches Q3, Q4, and the other end of the sampling resistive element R7 is grounded. A sample pin of the control chip U1 samples voltage from a high potential end (higher voltage end) of the sampling resistive element R7. In other embodiments, the sampling resistive element R7 may be omitted, the first terminals of the third and fourth switches Q3, Q4 may be grounded directly, and the sample pin FB of the control chip U1 may be connected to the positive terminal of the diode bridge rectifier D1, or the first terminal of the first switch Q1, or one of the ends of the balancing resistive element R4. By sampling a voltage of the above mentioned point, the line current flowing in the light series branch 2 can be calculated based on the sampled voltage.

The control chip U1 is used for switching off the first switching unit and the second switching unit and keeping the off-state of the first and the second switching units once the sampled voltage outputted by the sample circuit is equal to or higher than the preset value. The control chip U1 is also used for switching on and off the first and the second switching units respectively and alternately when the sampled voltage is lower than the preset value, as a result, the light series branch turns on and off alternately like twinkle stars.

Figure 5:
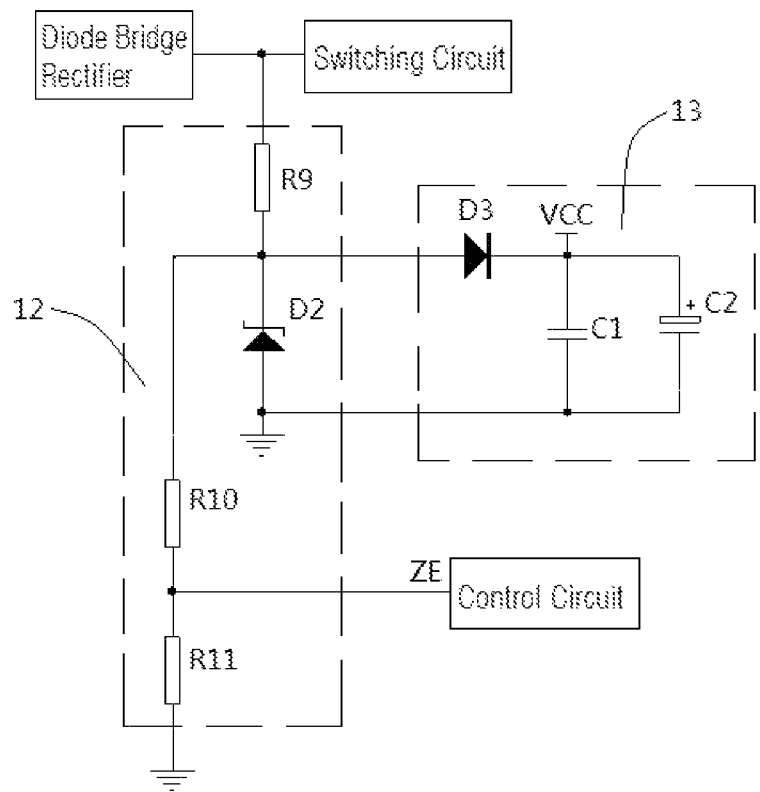
FIG. 5 is a circuit diagram of a zero cross detection circuit and a supply circuit in accordance with an embodiment of the invention.
Figure 6:
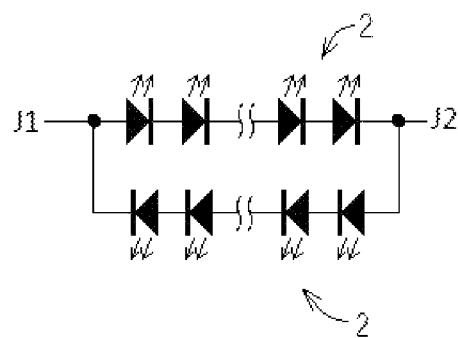
FIG. 6 is a circuit diagram of two light series branches connected in parallel and inversely.

The control chip U1 has a power supply pin VCC, a zero cross detecting pin ZE, a sample pin FB, a ground pin GND, and a first output pin OC1 and a second output pin OC2. In the embodiment, at the outside of the control chip U1, the power supply pin VCC is connected to a supply circuit 13 as shown in FIG. 5, the zero cross detecting pin ZE is connected to a zero cross detection circuit 12 as shown in FIG. 5, the sample pin FB is connected to the high voltage end of the sampling resistive element R7, the ground pin GND is grounded, the first output pin OC1 is connected to the control terminal of the fourth switch Q4, and the second output pin OC2 is connected to the control terminal of the third switch Q3.

Figure 4:
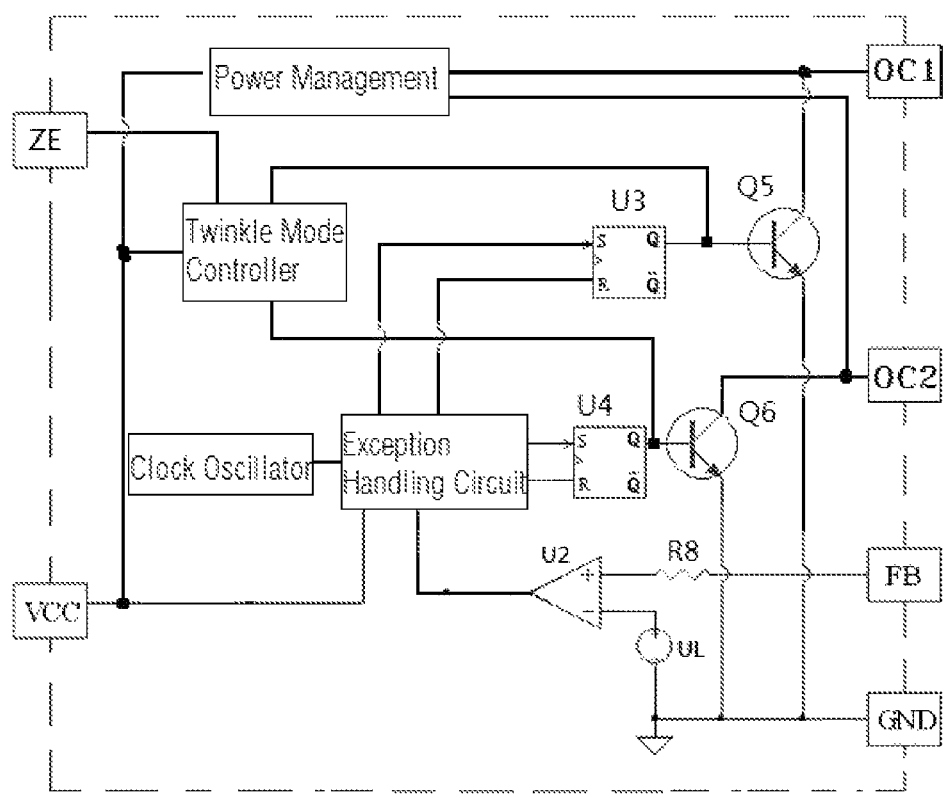
FIG. 4 is an internal circuit diagram of the control chip of the FIG. 3.

FIG. 4 illustrates an inner circuit diagram of the control chip U1. The inner circuit mainly integrates a clock oscillator circuit, an exception handling circuit, a power management circuit, a twinkle mode controller, a reference voltage source UL, a comparator amplifier U2, two triggers U3, U4, a fifth switch Q5 and a sixth switch Q6. In the embodiment, the fifth and the sixth switches Q5 and Q6 are both NPN type transistors, the first terminals of both are emitters, the second terminals of both are collectors, and the control terminals of both are bases. In the other embodiments, the fifth switch Q5 and the sixth switch Q6 may be chosen from MOSFET, IGBT, etc.

The clock oscillator circuit is used for providing clock signal for the other circuits or components in the control chip U1. Although only the excepting handling circuit is connected with the clock oscillator circuit in FIG. 4, it is understandably that the clock oscillator circuit also supplies clock signal for other circuits or components those need the clock signal.

The power management circuit is connected with the power supply pin VCC, the second terminals of the fifth and the sixth switches Q5, Q6. The power management circuit gets electricity with a steady voltage from outside of the control chip U1 via the power supply pin VCC, and supplies power for the other circuits in the control chip U1, for example but not limited to the second terminals of the fifth and sixth switches Q5, Q6, the comparator amplifier U2, the triggers U3, U4, and the clock oscillator circuit.

The reference voltage source UL is used for supplying a reference voltage. A positive input of the comparator amplifier U2 is connected with the sample pin FB via a resistive element R8, an inverse input of the comparator amplifier U2 is connected with the output of the reference voltage source UL, and the output of the comparator amplifier U2 is connected with the exception handling circuit. The exception handling circuit is connected with the control terminal of the fifth switch Q5 via the trigger U3, and connected with the control terminal of the sixth switch Q6 via the trigger U4. The first terminal of the fifth switch Q5 is connected to the ground pin GND, and the second terminal of the fifth switch Q5 is connected with the first output pin OC1. The first terminal of the sixth switch Q6 is connected to the ground pin GND, and the second terminal of the sixth switch Q6 is connected with the second output pin OC2.

The twinkle mode controller is connected with the power supply pin VCC, the control terminals of the fifth and the sixth switches Q5, Q6. The twinkle mode controller is used for alternately outputting switch-on signals (generally square-wave signal) to the fifth and the sixth switches Q5, Q6 to control the fifth and the sixth switches Q5, Q6 to switch on alternately, as thus, the first and the second output pins OC1, OC2 are grounded alternately, the fourth switch Q4 and the third switch Q3 switch off alternately, and the light series branch 2 illuminates and goes off alternately.

Because the output voltage of the diode bridge rectifier D1 is between 0~290V or 0~310V, when the output voltage of the diode bridge rectifier D1 is lower than a certain value (the certain value can be calculated base on the resistance values of the resistive elements R1, R4, R7 and the first to the fourth switches Q1, Q2, Q3, Q4), the first or the second switch Q1 or Q2 can not turns on as desired because there is not enough voltage applied to the emitter of the first or the second switch. As a result, the light series branch 2 may not illuminate when it should be, and a twinkle cycle is irregular. To solve this problem, the present invention utilizes a zero cross detection circuit. Please also referring to FIG. 5, a zero cross detection circuit 10 according to the embodiment includes a voltage-regulator diode (Zener diode for example) D2 and three resistive elements R9, R10 and R11. The resistive element R9 is connected between the positive output of the diode bridge rectifier D1 and the cathode of the voltage-regulator diode D2. The anode of the voltage-regulator diode D2 is grounded, and the cathode is also grounded via a series circuit composed of the resistive elements R10 and R11. A connecting point between the resistive elements R10 and R11 is connected to the twinkle mode controller of the control chip U1. Therefore, the control chip U1 can determine when it should control the switching circuit 11 to illuminate the light series branch 2 depending on the zero cross diction circuit 12. Preferable, the light series branch 2 is turned on when the output voltage of the diode bridge rectifier D1 is around its peak value.

In the embodiment, the twinkle mode controller may have several twinkle modes, such as a quick twinkle/blink, a slow twinkle/blink, a red-shift twinkle/blink, etc. A remote controller may be used to switch the twinkle mode, or a general electric switch may be used. The exist light strings is generally connected to the mains via a foot switch (in other words, the general electric switch). The light string is powered when the foot switch is tapped once, and powered off when the foot switch is tapped again. The control chip U1 can be configured that when the foot switch is tapped quickly, the twinkle mode is switched, and when the foot switch is tapped for a long time, the light string is powered off.

To achieve the above function, the supply circuit for supplying power to the power supply pin VCC of the control chip U1 should has an energy-storage capacitor or a bulk capacitor, for example but not limited to the supply circuit 13 as shown in FIG. 5. The supply circuit 13 includes a diode D3, a non-polarized capacitor C1 and an electrolytic capacitor C2. The anode of the diode D3 is connected to the positive output of the diode bridge rectifier D1 via a resistive element R9, and its cathode is connected to the power supply pin VCC, an end of the capacitor C1 and the positive end of the electrolytic capacitor C2. The other end of the capacitor C1 and the negative end of the electrolytic capacitor C2 is connected. When the foot switch is tapped quickly, the diode bridge rectifier D1 is powered off for a very short moment, and a voltage outputted by the supply circuit 13 will drop for an instant (will not to ground), when a voltage at the power supply pin VCC is lower than a preset value (2.5V, for example), the twinkle mode controller will switch the twinkle mode. Understandably, the twinkle mode controller may has memory function, when the light string is powered on after a long-time powered off, the light string may operate according to the previously twinkle mode.

The over-current detection function is realized depending on the exception handling circuit and the triggers U3, U4 of the control chip U1. When the sampled voltage at the sample pin FB is larger than or equal to the reference voltage, the output of the comparator amplifier U2 becomes inverse, in response, the exception handling circuit outputs two trigger signals in different time series to the R terminal and S terminal of the trigger U3, and two trigger signals in different time series to the R terminal and S terminal of the trigger U4. As a result, the output voltages of the triggers U3, U4 are locked and maintains a high voltage (larger than or equal to 0.7V), the fifth and the sixth switches Q5, Q6 are both turned on and conducted, the output pins OC1 and OC2 are kept grounded, the third and the fourth switches Q3, Q4 are maintained off-state, and the light series branch is powered off. At this moment, the triggers U3, U4 will not be reset only when the light string is powered off for a long time, and the voltage at the power supply pin VCC drops to 0V.

In operation, when the power plug 1 is inserted in the socket connecting in the mains supply, and the general electric switch (a foot switch for example) connected between the power plug 1 and the diode bridge rectifier D1 is clicked/tapped, the diode bridge rectifier D1 converts the AC current from the mains supply into DC current. The DC current is applied to the first and the second switches Q1, Q2 via the resistive element R1, and powers the control chip U1 via the supply circuit 13. The control chip U1 detects the output voltage of the diode bridge rectifier D1 via the zero cross detection circuit 12, the twinkle mode controller outputs switch-on-off signal (square-wave signal in the embodiment) to the control terminals of the fifth and sixth switches Q5, Q6 to turn on the fifth and sixth switches Q5, Q6 alternately according to the output of the zero cross detection circuit 12. When the switch Q5 is turned on, the switch Q6 is off, the voltage at the pin OC1 is low, the voltage at pin OC2 is high, the switch Q3 is turned on, the switch Q4 is off. A base voltage of the switch Q2 is low, thus the switch Q2 is turned on accordingly, while an emitter voltage and a base voltage of the switch Q1 is the same, the switch Q1 maintains off. Therefore, current flows through diode bridge rectifier D1, the resistive element R1, the switch Q2, the balancing resistive element R4, the switch Q3, the sample resistive element R7, then back to the diode bridge rectifier D1. In this case, the voltage at the first output terminal J1 is lower than that at the second output terminal J2, and the light series branch 2 is turned off when the positive end of the light series branch 2 is connected to the terminal J1. When the switch Q6 is turned on, the switch Q5 is off, the voltage at the pin OC1 is high, the voltage at pin OC2 is low, the switch Q3 is turned off, the switch Q4 is turned on. A base voltage of the switch Q1 is low, thus the switch Q1 is turned on accordingly, while an emitter voltage and a base voltage of the switch Q2 becomes the same, the switch Q2 turns off. Therefore, current flows through diode bridge rectifier D1, the resistive element R1, the switch Q1, the balancing resistive element R4, the switch Q4, the sample resistive element R7, then back to the diode bridge rectifier D1. In this case, the voltage at the first output terminal J1 is higher than that at the second output terminal J2, and the light series branch 2 is turned on illuminates when the positive end of the light series branch 2 is connected to the terminal J1. During the above process, the connection between the diode bridge rectifier D1 and the terminals AC1, AC2 of the mains supply may be cut and restored quickly, a twinkle mode is switched accordingly when the voltage at the pin VCC is lower than a preset value.

In the meantime, the control chip U1 detect the line current based on the sampled voltage at the high voltage end of the sample resistive element R7. The comparator amplifier U2 compares the sampled voltage and the reference voltage. When the sample voltage is lower than the reference voltage, the output of the comparator amplifier U2 does not change, the triggers U3, U4 do not act, the fifth and the sixth switches Q5, Q6 are controlled by the twinkle mode controller, the light series branch 2 turns on and off alternately. When the sample voltage is higher than or equal to the reference voltage, the output of the comparator amplifier U2 becomes inverse, in response, the exception handling circuit outputs two trigger signals in different time series to the R terminal and S terminal of the trigger U3 and outputs two trigger signals in different time series to the R terminal and S terminal of the trigger U4. As a result, the output voltages of the triggers U3, U4 are both locked and maintains a high voltage (larger than or equal to 0.7V), the fifth and the sixth switches Q5, Q6 are turned on and kept on the on-state, the output pins OC1 and OC2 are grounded, the switches Q3, Q4 are cut off, and the light series branch 2 is powered off and maintained the off-state. It is understandably, by configuring the parameters of the resistive elements R7, R8, and the reference voltage, the outputs of the triggers can be locked to high voltage to turn on the switches Q5, Q6 to protect the remainder lights in the light series branch when a number of the failed lamps and removed lamps reaches to a preset number. When the light series branch 2 is turned off because of over-current, people should pull out the plug of the light string from the mains supply, then replace the burned lamps and add new lamps to empty holders. After this, when the light string is connected to the mains supply, it can operate and illuminate again.

In the embodiment, the triggers U3, U4 are RS triggers. It is also understandably, other types of triggers can be utilized when the control chip has other functions, such as lightning protecting function, etc. When the voltage type of the output of the comparator amplifier changes, corresponding type of the first switch transistor, such as metal-oxide-semiconductor field effect transistor, could be utilized.

In another exemplary embodiment, the structure of the protecting circuit is the same as that in the above embodiment, the difference is: for each protecting circuit 3, two light series branches are connected between the first and the second output terminals J1, J2, and the two light series branches are configured inverse. That is, the positive end of one light series branch connects with the negative end of the other light series, and the negative end of the one light series branch connects with the positive end of the other light series. Depend on the configuration, one of the two light series branches illuminates at any time point, thus a load of the whole circuit is stable, and the light string operates more stably. Preferably, the colors of the two light series branches are different, thus, the colors of the light the light string emitted changes regularly, let the light string more ornamental. In other embodiments, there may be two more light series branches connected between the first and the second output terminals J1, J2 according to need.

To sum up, the light string of the present invention has a protecting circuit with a reference voltage source, thus accurate control of the switch is achieved. When the number of the failed lamps and removed lamps reaches to a preset number, which lead to a line current of the light series branch becomes larger than or equal to a preset value, the line switch is opened to protecting the reminder light from been burned out. After the user replaces the burned lamps with normal lamps, and inserts normal lamps in the empty sockets, the light string can illuminate again. Furthermore, the light string can light on and off alternately like twinkling stars, or the colors can be changed alternately, and a twinkle mode can be changed, thus has more ornamental. The protecting circuit only includes a diode rectifier circuit, four switch tubes, seven resistive elements, a Zener diode, a diode, a capacitor, a DC capacitor, and a micro-chip, the resistors and the capacitors connected parallel to all the lamps are omitted, thus the structure of the light string is more simple, thus low cost, low energy loss can be achieved.

In the exemplary embodiment, the control circuit in the protecting circuit is in the form of a chip, it is understandably, in the other embodiment, the control circuit could be an analog circuit. The line switch can also use other switching transistor, such as metal-oxide-semiconductor field effect transistor.

While the invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

What is claimed is:

1. A light string, comprising:
   at least one light series branch each comprising a plurality of lights connected in series; and
   a protecting circuit connected between the at least one light series branch and an AC power supply, the protecting circuit comprising:
   a diode bridge rectifier configured for converting an AC current from the AC power supply to a DC current;
   a switching circuit with an input terminal connected with a positive output of the diode bridge rectifier, the switching circuit comprising a first switching unit and a second switching unit and having a first output terminal and a second output terminal connected with ends of the at least one light series branch;
   a sample circuit configured for sampling a line current flowing in the at least one light series branch or a current relative to the line current and outputting a sampled voltage; and
   a control circuit configured for switching off the first and the second switching units and keeping the first and the second switching units at off-state when the sampled voltage is larger than or equal to a preset voltage, and controlling the first and the second switching units to turn on and turn off the at least one light series branch, such that each light series branch illuminates and goes off alternately like twinkling stars;
   wherein each light is such configured that when a lamp of the light is removed from the light or the lamp is burned out, the remainder lamps in the light string can still illuminate, and a voltage drop across each remainder lamp become higher than before.

2. The light string of claim 1, wherein the first switching unit comprises a first switch, a fourth switch and a balancing resistive element, the second switching unit comprises a second switch, a third switch and the balancing resistive element; first terminals of the first switch and the second switch are connected to the positive output of the diode bridge rectifier via a resistive element, and second terminals of the first switch and the second switch are connected to second terminals of the third switch and the fourth switch, respectively; the second terminals of the first switch and the second switch are also connected with two ends of the balancing resistive element; a control terminal of the first switch is connected to the second terminal of the second switch via a resistive element; a control terminal of the second switch is connected to the second terminal of the first switch via a resistive element; first terminals of the third switch and the fourth switch are connected to a negative output of the diode bridge rectifier, and control terminals of the third switch and the fourth switch are connected to two outputs of the control circuit, respectively; the two ends of the balancing resistive element acts as the first and second output terminals of the switching circuit, respectively.

3. The light string of claim 2, wherein the first switch and the second switch are PNP type transistors, and the second switch and the fourth switch are NPN type transistors; the first terminals of the first to the fourth switches are emitters, the second terminals of the first to the fourth switches are collectors, and the control terminals are bases.

4. The light string of claim 3, wherein the sample circuit comprises a sampling resistive element with one end connected to the first terminals of the third and fourth switches, and the other end connected to the negative output of the diode bridge rectifier; the one end of the sampling resistive element is connected to a sample terminal of the control circuit.

5. The light string of claim 1, wherein the control circuit comprises:
an exception handling circuit;
a power management circuit;
a reference voltage source configured for supplying a reference voltage;
a comparator amplifier with an input connected with the output terminal of the sample circuit, the other input connected with the reference voltage source, and an output connected with the exception handling circuit;
a fifth switch with a first terminal connected with the negative output of the diode bridge rectifier, a second terminal acting as a first output terminal of the control circuit and connected with the power management circuit, and a control terminal connected with the exception handling circuit via a first trigger;
a sixth switch with a first terminal connected with the negative output of the diode bridge rectifier, a second terminal acting as a second output terminal of the control circuit and connected with the power management circuit, and a control terminal connected with the exception handling circuit via a second trigger; and
a twinkle mode controller connected with the control terminals of the fifth and the sixth switches and configured for outputting switch-on signals to the fifth and the sixth switches to control the fifth and the sixth switches to switch on alternately.

6. The light string of claim 5, wherein the fifth and the sixth switches are both NPN type transistors with their collectors acting as the first terminals, their emitters acting as the second terminals, and their bases acting as the control terminals.

7. The light string of claim 5, wherein further comprising a zero cross detection circuit connected between the twinkle mode controller and the diode bridge rectifier, the zero cross detection circuit comprises a voltage-regulator diode and three resistive elements, one of the three resistive elements is connected between a positive output of the diode bridge rectifier and a cathode of the voltage-regulator diode, the anode of the voltage-regulator diode is grounded, and the cathode is also grounded via a series circuit composed of the other two resistive elements; a connecting point between the other two resistive elements is connected to the twinkle mode controller.

8. The light string of claim 7, wherein further comprising a supply circuit configured for supplying a stable voltage to the control circuit, the supply circuit comprises a diode, a non-polarized capacitor and an electrolytic capacitor, an anode of the diode is connected to the positive output of the diode bridge rectifier via a resistive element, and its cathode is connected to the twinkle mode controller, an end of the non-polarized capacitor and a positive end of the electrolytic capacitor; the other end of the non-polarized capacitor and a negative end of the electrolytic capacitor is connected.

9. The light string of claim 5, wherein each light of at least a part of the plurality of lights comprises:
a lamp with at least two lamp pins extending downwardly therefrom;
a socket defining at least two wire holes configured for permitting the at least two lamp pins to extend outside the socket, the socket comprising:
a receiving part configured for detachably receiving a lower part of the lamp;
a guiding block connected at a bottom end of the receiving part; and
a plug-in piece extending downwardly from a bottom end of the guiding block; and
a holder configured for detachably receiving the socket and at least two separated configured conductive pieces wherein each conductive piece comprising:
a first conductive part configured for electrically attached with a corresponding one of the at least two lamp pins; and
a second conductive part connected with the first conductive part and a electrical wire which is used for connecting the light with an adjacent light;
wherein when the socket is inserted in the holder, the first conductive parts are respectively electrically connected with the at least two lamp pins and are electrically isolated by the receiving part and the guiding block, and the second conductive parts are electrically isolated by the guiding block and the plug-in piece; when the socket is removed from the holder, at least the second conductive parts are electrically attached.

10. The light string of claim 9, wherein the lamp is an LED lamp.

11. The light string of claim 1, wherein the light string comprises two or more light series branches and one or more protecting circuits, each protecting circuit is connected with two light series branches, a negative end of one of the two light series branches is connected with a positive end of the other of the two light series branches, and a positive end of the one of the two light series branches is connected with a negative end of the other of the two light series branches.

12. A light string, comprising:
at least one light series branch each comprising a plurality of lights connected in series; and
a protecting circuit connected between the at least one light series branch and an AC power supply, the protecting circuit comprising:
a diode bridge rectifier configured for converting an AC current from the AC power supply to a DC current;
a switching circuit with an input terminal connected with a positive output of the diode bridge rectifier, the switching circuit having a first output terminal and a second output terminal connected with ends of the at least one light series branch;
a sample circuit configured for sampling a line current flowing in the at least one light series branch or a current relative to the line current and outputting a sampled voltage; and
a control circuit configured for controlling the switching unit to turn off the at least one light series branch and keep the at least one light series branch at off-state when the sampled voltage is larger than or equal to a preset voltage, and controlling the switching circuit to turn on and turn off the at least one light series branch, such that each light series branch illuminates and goes off alternately like twinkling stars;
wherein each light is such configured that when a lamp of the light is removed from the light or the lamp is burned out, the remainder lamps in the light string can still illuminate, and a voltage drop across each remainder lamp become higher than before.

13. The light string of claim 12, wherein the switching circuit comprises a first switch, a second switch, a third switch, a fourth switch and a balancing resistive element; first terminals of the first switch and the second switch are connected to the positive output of the diode bridge rectifier via a resistive element, and second terminals of the first switch and the second switch are connected to second terminals of the third switch and the fourth switch, respectively; the second terminals of the first switch and the second switch are also connected with two ends of the balancing resistive element; a control terminal of the first switch is connected to the second terminal of the second switch via a resistive element; a control terminal of the second switch is connected to the second terminal of the first switch via a resistive element; first terminals of the third switch and the fourth switch are connected to a negative output of the diode bridge rectifier, and control terminals of the third switch and the fourth switch are connected to two outputs of the control circuit, respectively; the two ends of the balancing resistive element acts as the first and second output terminals of the switching circuit, respectively.

14. The light string of claim 13, wherein the first switch and the second switch are PNP type transistors, and the second switch and the fourth switch are NPN type transistors; the first terminals of the first to the fourth switches are emitters, the second terminals of the first to the fourth switches are collectors, and the control terminals are bases.

15. The light string of claim 14, wherein the sample circuit comprises a sampling resistive element with one end connected to the first terminals of the third and fourth switches, and the other end connected to the negative output of the diode bridge rectifier; the one end of the sampling resistive element is connected to a sample terminal of the control circuit.

16. The light string of claim 12, wherein the control circuit comprises:
an exception handling circuit;
a power management circuit;
a reference voltage source configured for supplying a reference voltage;
a comparator amplifier with an input connected with the output terminal of the sample circuit, the other input connected with the reference voltage source, and an output connected with the exception handling circuit;
a fifth switch with a first terminal connected with the negative output of the diode bridge rectifier, a second terminal acting as a first output terminal of the control circuit and connected with the power management circuit, and a control terminal connected with the exception handling circuit via a first trigger;
a sixth switch with a first terminal connected with the negative output of the diode bridge rectifier, a second terminal acting as a second output terminal of the control circuit and connected with the power management circuit, and a control terminal connected with the exception handling circuit via a second trigger; and
a twinkle mode controller connected with the control terminals of the fifth and the sixth switches and configured for outputting switch-on signals to the fifth and the sixth switches to control the fifth and the sixth switches to switch on alternately.

17. The light string of claim 16, wherein further comprising a zero cross detection circuit connected between the twinkle mode controller and the diode bridge rectifier, the zero cross detection circuit comprises a voltage-regulator diode and three resistive elements, one of the three resistive elements is connected between a positive output of the diode bridge rectifier and a cathode of the voltage-regulator diode, the anode of the voltage-regulator diode is grounded, and the cathode is also grounded via a series circuit composed of the other two resistive elements; a connecting point between the other two resistive elements is connected to the twinkle mode controller.

18. The light string of claim 17, wherein further comprising a supply circuit configured for supplying a stable voltage to the control circuit, the supply circuit comprises a diode, a non-polarized capacitor and an electrolytic capacitor, an anode of the diode is connected to the positive output of the diode bridge rectifier via a resistive element, and its cathode is connected to the twinkle mode controller, an end of the non-polarized capacitor and a positive end of the electrolytic capacitor; the other end of the non-polarized capacitor and a negative end of the electrolytic capacitor is connected.

19. The light string of claim 12, wherein the light string comprises two or more light series branches and one or more protecting circuits, each protecting circuit is connected with two light series branches, a negative end of one of the two light series branches is connected with a positive end of the other of the two light series branches, and a positive end of the one of the two light series branches is connected with a negative end of the other of the two light series branches.

20. A light string, comprising:
two light series branches each comprising a plurality of lights connected in series; and
a protecting circuit connected between the two light series branches and an AC power supply, the protecting circuit comprising:
a switching circuit comprising a first switching unit and a second switching unit and having a first output terminal and a second output terminal connected with ends of the two light series branches;
a sample circuit configured for sampling a line current flowing in the two light series branches or a current relative to the line current and outputting a sampled voltage; and
a control circuit configured for switching off the first and the second switching units and keeping the first and the second switching units at off-state when the sampled voltage is larger than or equal to a preset voltage, and controlling the first and the second switching units to turn on and turn off the two light series branches, such that each light series branch illuminates and goes off alternately like twinkling stars;
wherein each light is such configured that when a lamp of the light is removed from the light or the lamp is burned out, the remainder lamps in the light string can still illuminate, and a voltage drop across each remainder lamp become higher than before;
wherein the first output terminal is connected to a positive end of one of the two light series branches and a negative end of the other of the two light series branches, and the second output terminal is connected to a negative end of the one of the two light series branches and a positive end of the other of the two light series branches;
wherein one of the two light series branches emits lights with different colors from those emitted by the other of the two light series branches.

* * * * *